(12) United States Patent  (10) Patent No.: US 8,285,926 B2
Karlsson  (45) Date of Patent: Oct. 9, 2012

(54) CACHE ACCESS FILTERING FOR PROCESSORS WITHOUT SECONDARY MISS DETECTION

(75) Inventor: Martin R. Karlsson, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 229 days.

(21) Appl. No.: 12/772,809

(22) Filed: May 3, 2010

(65) Prior Publication Data

US 2011/0271057 A1   Nov. 3, 2011

(51) Int. Cl.
*G06F 13/00* (2006.01)
*G06F 13/28* (2006.01)
(52) U.S. Cl. .................... 711/113; 711/E12.024
(58) Field of Classification Search .......... 711/113, 711/E12.024
See application file for complete search history.

(56) References Cited

U.S. PATENT DOCUMENTS 6,393,536 B1*  5/2002  Hughes et al. ............... 711/159
7,434,000 B1*  10/2008  Barreh et al. ................ 711/118
2011/0107057 A1*  5/2011  Petolino, Jr. ................. 711/207

* cited by examiner

*Primary Examiner* — Edward Dudek, Jr.
(74) *Attorney, Agent, or Firm* — Park, Vaughan, Fleming & Dowler LLP; Mark Spiller

(57) ABSTRACT

The disclosed embodiments provide a system that filters duplicate requests from an L1 cache for a cache line. During operation, the system receives at an L2 cache a first request and a second request for the same cache line, and stores identifying information for these requests. The system then performs a cache array look-up for the first request that, in the process of creating a load fill packet for the first request, loads the cache line into a fill buffer. After sending the load fill packet for the first request to the L1 cache, the system uses the cache line data still stored in the fill buffer and stored identifying information for the second fill request to send a subsequent load fill packet for the second request to the L1 cache without performing an additional cache array look-up.

20 Claims, 7 Drawing Sheets

US 8,285,926 B2

CACHE ACCESS FILTERING FOR PROCESSORS WITHOUT SECONDARY MISS DETECTION

BACKGROUND

1. Field

This disclosure generally relates to techniques for detecting duplicate requests for a cache line in a level two cache. More specifically, this disclosure relates to techniques for filtering duplicate requests for a cache line in a processor with a level one cache that does not support secondary miss detection.

2. Related Art

High instruction throughput in a processor typically involves rapid translation of virtual addresses and fast memory accesses. To achieve such throughput, the memory subsystem of the processor may include a number of specialized hardware structures, including multiple levels of caches.

During execution, a processor may execute a number of program instructions that access the same cache line (e.g., the same cache entry). If this cache line is not available in a level one (L1) cache, the first miss causes the L1 cache to send a corresponding request to a level two (L2) cache. Upon receiving a second subsequent request for the same cache line, secondary miss detection logic in the L1 cache detects that another request for that cache line is already pending, and ensures that no duplicate requests are sent to the L2 cache for the same cache line.

Unfortunately, providing secondary miss detection in an out-of-order processor can involve substantial additional complexity. For instance, if a number of stalled instructions are waiting for the same cache line, receiving a fill packet at the L1 cache may involve simultaneously writing a large number of registers and activating a large associated set of instructions. Such capabilities may involve substantial additional cost in terms of area, timing, and complexity. Alternatively, not providing secondary miss detection can substantially increase duplicate request traffic for the L2 cache, thereby increasing cache load unnecessarily and reducing processor performance.

Hence, what is needed are techniques for accessing cache data efficiently without the above-described problems of existing techniques.

SUMMARY

Some embodiments provide a system that filters duplicate requests from an L1 cache for a cache line. During operation, the system receives at an L2 cache a first request and a second request for the same cache line, and stores identifying information for these requests. The system then performs a cache array look-up for the first request that, in the process of creating a load fill packet for the first request, loads the cache line into a fill buffer. After sending the load fill packet for the first request to the L1 cache, the system uses the cache line data still stored in the fill buffer and stored identifying information for the second fill request to send a subsequent load fill packet for the second request to the L1 cache without performing an additional cache array look-up.

In some embodiments, the system prepares additional fill packets by preserving the cache line data from the first load fill packet in the fill buffer while iteratively updating the fill buffer to include request identifiers associated with other fill requests.

In some embodiments, the L2 cache receives multiple duplicate requests for the same cache line from the L1 cache because the L1 cache does not support secondary miss detection. Not supporting secondary miss detection in an L1 cache facilitates simplifying the hardware and timing requirements for the L1 cache.

In some embodiments, re-using the cache line data in the fill buffer for duplicate requests facilitates sending additional load fill packets for the cache line while avoiding duplicate cache array look-ups in the L2 cache.

In some embodiments, the L2 cache stores identifying information that includes one or more of the following: an address associated with a cache line; a first request identifier associated with a first request for the cache line; and one or more additional request identifiers associated with additional requests for the cache line.

In some embodiments, information associated with one or more requests for the same cache line is stored in a pending-access status-holding register (PASHR). Storing information in the PASHR facilitates updating a request identifier in an outgoing load fill packet to respond to a specific request. In some embodiments, two or more PASHRs may be used to track multiple requests associated with two or more different cache lines.

In some embodiments, the system invalidates information in a PASHR and a fill buffer upon receiving a cache line invalidation request for a cache line.

In some embodiments, the L1 and L2 caches are translation lookaside buffers (TLBs) that cache address translation data for a processor.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Drawbacks of Secondary Miss Detection in an Out-of-Order Processor

In a processor, high instruction throughput typically involves rapid translation of virtual addresses and fast memory accesses. Hence, a processor may include a number of specialized hardware structures to cache frequently accessed data and to speed up address translations. In modern processors, such specialized hardware structures may include multiple levels of caches and multiple levels of translation lookaside buffers (TLBs), which cache page table translation information.

Figure 1:
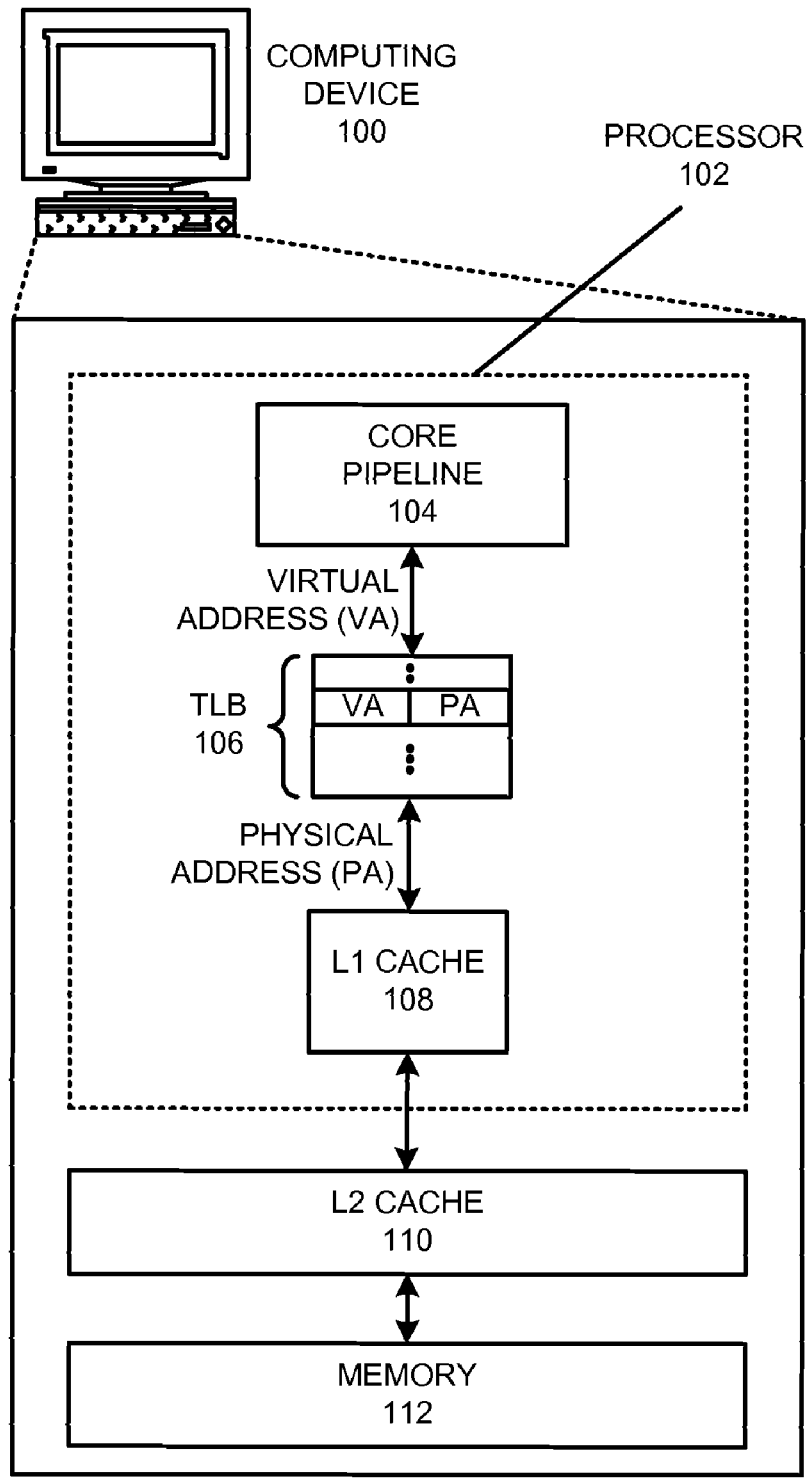
FIG. 1 illustrates an exemplary computing device that includes a set of structures for translating memory addresses and caching memory data in accordance with an embodiment.

FIG. 1 illustrates an exemplary computing device 100 that includes a set of structures for translating memory addresses and caching memory data. Computing device 100 can include a processor 102 with one or more processor cores, each of which includes a processor core pipeline 104, a TLB 106, and an L1 cache 108.

The instructions executed in core pipeline 104 typically reference virtual addresses (VAs). If TLB 106 contains the translation information needed for a given virtual address, that virtual address is translated into a physical address (PA), which is then sent to L1 cache 108 along with a corresponding load or store request. In the case of a TLB miss, the needed translation information needs to be loaded into TLB 106 (e.g., from an L2 TLB or other TLB fill mechanism) before the request can proceed.

If the request for the translated address hits in L1 cache 108, the data access instruction can proceed (e.g., storing the data in the cache for a store instruction, or loading the data from the cache for a load or pre-fetch instruction). A miss in L1 cache 108 results in a request to an L2 cache 110, which returns the needed cache data to the requesting L1 cache 108. A cascading miss in L2 cache 110 results in a request to main memory 112. Note that the memory hierarchy illustrated in FIG. 1 is exemplary, and different implementations may have additional cache and TLB levels as well as cache and TLB structures that are shared across multiple processor cores.

During execution, a processor core may execute a number of program instructions that access the same cache line. If this cache line is not available in an L1 cache, the first miss prompts the L1 cache to send a corresponding request to an L2 cache. Address information for this request is stored in a miss queue in the L1 cache (e.g., in a miss status-holding register, or MSHR), and if the processor and/or L1 cache support secondary miss detection, the addresses of subsequent L1 cache misses are compared with the addresses for pending requests. Upon receiving a second subsequent request for the same cache line, secondary miss detection logic in the L1 cache detects that a first request for that cache line is already pending, and ensures that no duplicate requests are sent to the L2 cache for the same cache line. Thus, secondary miss detection hardware can reduce duplicate requests to the L2 cache, thereby reducing the load on the L2 cache.

While secondary miss detection capabilities can provide performance benefits, they can also involve undesired conceptual and structural complexity (e.g., additional area, timing, and complexity constraints, such as needing additional ports on hardware register files to simultaneously write multiple results from a cache line or increasing the complexity of instruction wake-up logic in out-of-order processors). Thus, some architectures do not include secondary miss detection capabilities. However, the lack of such capabilities can substantially reduce processor performance, especially for processors that support out-of-order execution.

Out-of-order execution capabilities allow a processor to continue to execute additional instructions even when the data needed to perform a preceding instruction is not available. Instructions awaiting data wait until their inputs become available, while other independent instructions are allowed to complete execution. However, these later instructions are not "retired" (e.g., the results of the completed instructions may be stored in a re-order buffer, but are not yet written back to a register file) until the results of all preceding ("older") instructions have been written to the register file. This re-ordering of results preserves the appearance that the final results were derived by instructions that were executed in order. An out-of-order processor can continue to process instructions across operations (such as a data miss) that would otherwise result in a processor stall, thereby increasing average instruction throughput for the out-of-order processor.

Out-of-order architectures typically incorporate the notion of a window of instructions that are currently being considered for execution. For instance, this "issue window" (sometimes also referred to as a pick queue, issue queue, or scheduler) may include 64 instructions, with the processor selecting some subset of the instructions in the issue window for execution in each cycle (e.g., for a four-way superscalar machine, selecting four instructions that are ready to execute and sending them to the execution units; note that the select and execute operations for an instruction may occur in different cycles in such an architecture). For each new cycle, the processor must determine which instructions are ready to execute (e.g., have all their needed inputs), select a suitable set of such instructions, and then execute them. For instance, an instruction in the issue window may not be ready to execute because it is waiting for an input from a cache. Upon receiving a load fill, the wake-up logic in the processor: (1) determines whether all of the inputs for a given instruction are now available; (2) determines the priority of the ready instructions; and (3) signals that a chosen set of instruction(s) should be executed.

Consider an out-of-order processor that does not include secondary miss detection capabilities. In such processors, there is a precise one-to-one mapping between fill responses and instruction wake-ups that simplifies the register file and the often timing-critical wake-up logic. For instance, a load instruction that hits in the TLB but misses in the L1 data cache can be deallocated from the issue window. Note that this instruction typically is not retired completely, but is still tracked in a re-order buffer (ROB) in case the instruction or a preceding instruction triggers an exception. Cache line data received from a fill packet goes through an aligner and is written into the processor pipeline and/or a working register file, as needed.

Eliminating secondary miss detection simplifies processor logic, but requires each L1 cache miss to be handled individually. For instance, ten contiguous accesses that miss in the L1 cache for the same cache line will result in ten separate fill requests that need to be tracked by the L1 cache, and then serviced by ten separate fill packets from the L2 cache. Each fill sent by the L2 cache and received by the L1 cache is associated with identifying information that causes one pending instruction to be woken up. However, this means that the L2 cache may serially repeat a large number of cache look-ups. For instance, for an application that accesses memory with ideal spatial locality (i.e., all words in a cache line are used), four requests would be sent to the L2 cache for each cache line (for 32-byte cache lines). In this scenario, the number of L2 accesses and the resulting dynamic power consumption of the L2 cache would be roughly four times that of an architecture that includes an L1 cache with secondary miss detection. The multiple identical requests would also increase the bandwidth pressure on the L2 cache, thereby delaying snooping operations and other requests (e.g., prefetch requests).

Note that access patterns that exhibit substantial spatial locality are quite common. Consider, for example, a memory copy operation that strides through a memory array loading bytes from one location and storing them to another memory array at another memory location. For cache lines with a size of 16 words, the read operation would involve 16 successive load instructions. The L2 cache would receive the read request for the first word of the cache line, and while performing a cache array look-up (and, in the case of an L2 cache miss, a memory access), would typically already receive some or all of the next 15 load fill requests. A similar situation would also arise for cache fill requests issued for the 16 successive store instructions (for the copy operation) that issue to load the necessary target cache line into the L1 cache. Such duplicate requests can cause substantial additional power consumption and contention in the L2 cache.

One approach attempts to reduce secondary miss overhead in out-of-order processors by keeping subsequent instructions that access the cache line in the processor's issue window, and then re-issuing these instructions after the load fill is received. This approach alleviates the need to perform multiple simultaneous writes to the register file; only the results for the original instruction need to be written initially, and the subsequent instructions will re-issue (and hence hit the cache line after the cache line has already been loaded in the L1 cache). However, downsides of this approach include occupying valuable issue window entries (e.g., restricting the set of issue window entries that are available) and wasting load/store unit (LSU) bandwidth.

The issue window is often the most timing-critical section of the processor pipeline. An ideal issue window would be large (e.g., able to consider a large set of candidate instructions), so that the processor can look far ahead to find independent instructions when a large number of pending instructions are delayed. Unfortunately, area, timing, and complexity constraints often limit the size of the issue window. As a result, when multiple instructions attempt to access a cache line and the cache line misses, a large proportion of the issue window may contain instructions that cannot currently proceed. The resulting restriction in the set of issue window entries that are available limits the set of candidate instructions that can be chosen for execution, which can reduce the instruction throughput and hence processor performance.

Embodiments of the present invention involve techniques for reducing the L2 cache performance impacts and additional power consumption associated with eliminating secondary miss detection in an L1 cache.

Cache Access Filtering for Processors without Secondary Miss Detection

While some of the previously described techniques catch duplicate fill requests in a requesting L1 cache (using secondary miss detection), embodiments of the present invention involve techniques that instead detect and manage such duplicate fill requests in the receiving L2 cache. For instance, the L2 cache can detect that a subsequent fill request is for an already-requested cache line, and use stored information associated with the duplicate requests to reduce the number of cache look-ups and power consumption in the L2 cache. Eliminating secondary miss detection in the L1 cache and moving complexity to the L2 cache, which is less timing-critical than the processor pipeline logic, facilitates reducing unnecessary duplicate cache look-ups (thereby reducing L2 cache power consumption), as well as simplifying the highly timing-sensitive LSU and wake-up logic of the processor.

During operation, an L2 cache typically: (1) receives a fill request from an L1 cache; (2) performs an array look-up for the requested address; (3) loads the corresponding cache line into a fill buffer (e.g., a set of hardware flops that temporarily store the data read out of the cache array during the look-up process); and then (4) sends the completed fill packet in the fill buffer to the requesting L1 cache. The fill request from the L1 cache includes an identifier for the request, and the corresponding fill packet from the L2 cache also includes an identifier that allows the L1 cache to identify the receiving instruction and/or registers that should be associated with the fill packet.

Note that, after the fill packet is sent, the data values (i.e., the cache line data) stored in the hardware flops of the fill buffer are still valid. If spatial locality is high, this stored data can be used to send additional fill requests for the same cache line. Because spatial locality typically is high, embodiments of the present invention preserve the data in this fill buffer after the initial fill packet for the cache line is sent, and use the preserved data for subsequent duplicate requests. The L2 cache does not need to perform additional array look-ups for such duplicate requests, but instead only needs to overwrite the identifier and/or some other select fields in the fill buffer before sending subsequent (duplicate) fill packets. Such techniques allow the L2 cache to send (duplicate) fill packets back to the L1 cache more quickly, while also consuming fewer L2 cache resources and reducing L2 cache contention.

Some embodiments involve including a pending-access status-holding register (PASHR) in an L2 cache. For instance, this PASHR may store information that identifies the address range for a cache line that is currently stored in a fill buffer, as well as identifying information for one or more additional duplicate fill requests that are pending for that cache line. Storing such information in the PASHR facilitates checking whether the cache line needed by an incoming fill request is already available in the fill buffer and, if so, creating and sending the corresponding fill packet for such a duplicate request with low overhead.

Figure 2A:
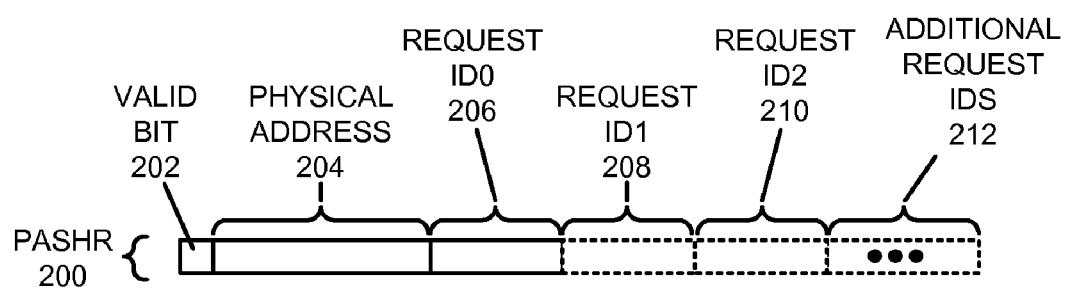
FIG. 2A illustrates the contents of an exemplary pending-access status-holding register in accordance with an embodiment.
Figure 2B:
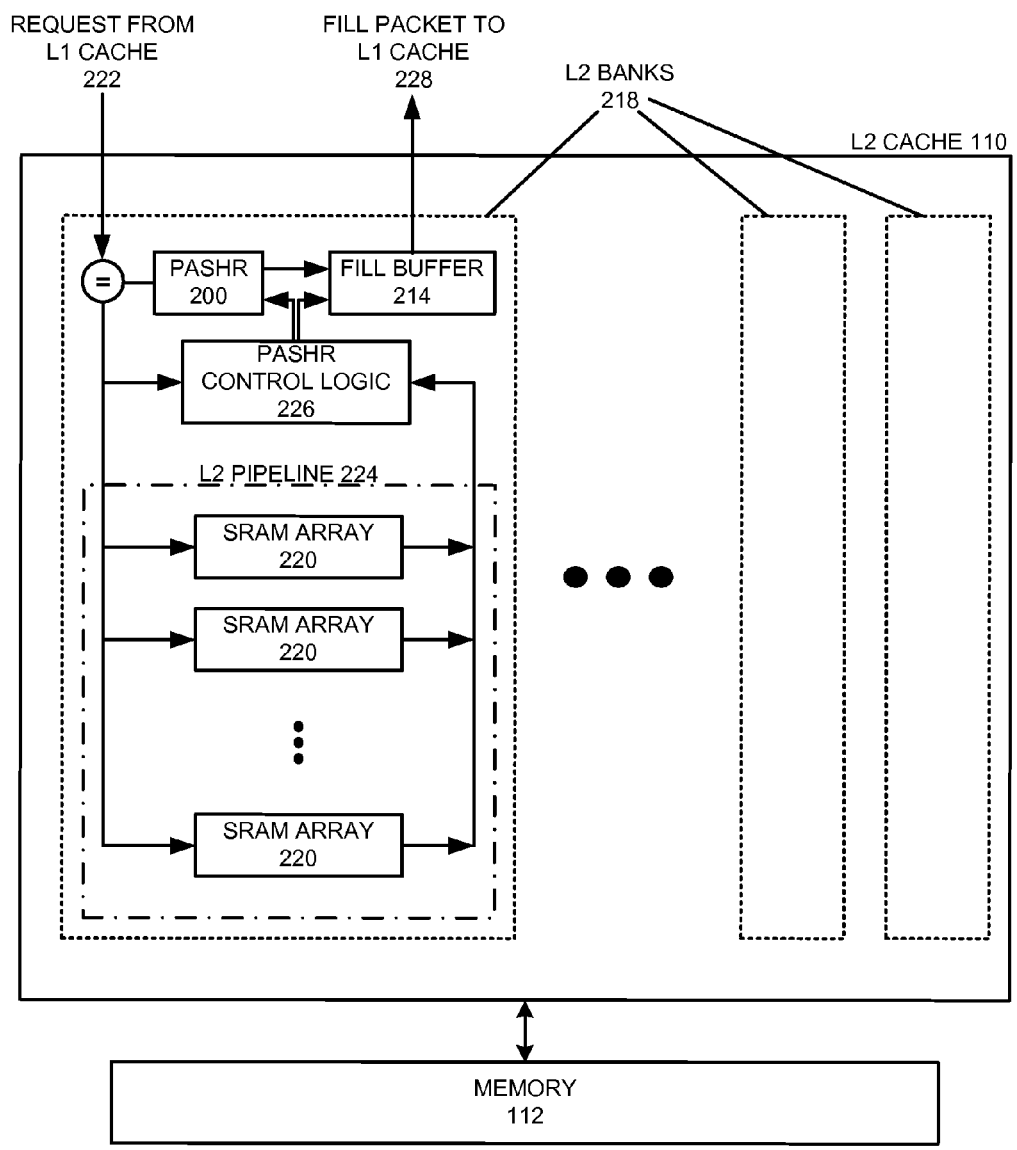
FIG. 2B illustrates using an exemplary pending-access status-holding register in an L2 cache to filter duplicate cache access requests for a processor without secondary miss detection in accordance with an embodiment.

FIGS. 2A and 2B illustrate an exemplary PASHR 200 that is associated with a fill buffer 214. FIG. 2A illustrates the contents of PASHR 200, while FIG. 2B illustrates using PASHR 200 in L2 cache 110 to filter duplicate cache access requests for a processor without secondary miss detection.

In FIG. 2A, PASHR 200 includes a valid bit 202 that indicates whether a valid cache line is currently loaded in the associated fill buffer 214, as well as physical address information 204 that is associated with the cache line data currently in fill buffer 214. PASHR 200 also includes one or more fields (206-212) that are used to store identifying information for one or more outstanding fill requests. For instance, each of fields 206-212 may store a request ID that is associated with a specific data miss (and fill request) for the same cache line in the L1 cache.

FIG. 2B illustrates using PASHR 200 in the context of L2 cache 110, which can include one or more banks 218 of multiple SRAM arrays 220. If a fill request from L1 cache 222 arrives in one of these banks 218, and valid bit 202 of PASHR 200 is not set, the physical address that identifies the cache line is stored in field 204 of PASHR 200. In parallel, the physical address is also sent on to the SRAM arrays 220 in the L2 pipeline 224 of an L2 bank 218 as a cache array look-up.

The physical address in each subsequent incoming fill request is compared to the physical address 204 recorded in PASHR 200. If the subsequent fill request is for the same cache line, the cache array look-up is stifled, and the request ID associated with the fill request is recorded in PASHR 200 (e.g., in one of fields 206-212). After the data from the cache array look-up (associated with the first fill request for the cache line) becomes available, it is routed by PASHR control logic 226 into fill buffer 214. PASHR control logic 226 then ensures that a fill packet 228 is sent to the L1 cache for each request ID that is stored in PASHR 200. More specifically, PASHR control logic 226 iteratively updates the information in fill buffer 214 with information for each fill request that was received (e.g., with the request IDs in fields 206-212), and iteratively sends out fill packets 228 for each of these fill requests.

Figure 3:
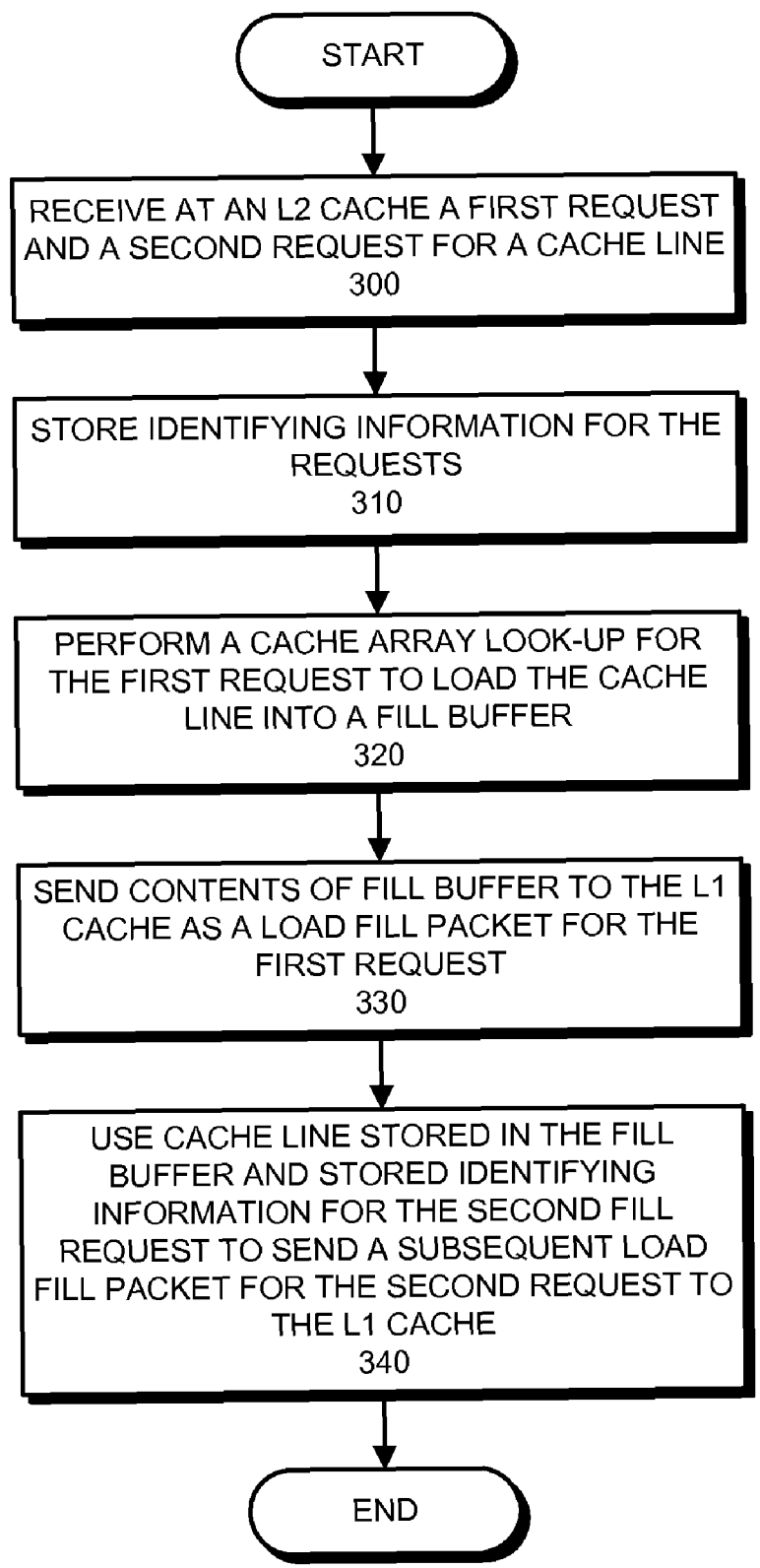
FIG. 3 presents a flow chart that illustrates the process of filtering duplicate cache requests for processors without secondary miss detection in accordance with an embodiment.

FIG. 3 presents a flow chart that illustrates the process of filtering duplicate requests from an L1 cache for a cache line. During operation, the system receives at an L2 cache a first request and a second request for the same cache line (operation 300), and stores identifying information for these requests (operation 310). The system then performs a cache array look-up for the first request that, in the process of creating a load fill packet for the first request, loads the cache line into a fill buffer (operation 320). After sending the load fill packet for the first request to the L1 cache (operation 330), the system uses the cache line still stored in the fill buffer and stored identifying information for the second fill request to send a subsequent load fill packet for the second request to the L1 cache (operation 340).

Note that various techniques may be used to track dependency information for an L1 cache's pending fill requests. In some embodiments, the L1 cache may store such information in a miss queue. Alternatively, some embodiments save area by not storing such information in the L1 cache, but instead sending the information to the L2 cache, which then includes the necessary information in the response packet that is sent back to the L1 cache. In either scenario, the L1 cache inserts into the fill request the identifying information that will be stored in the PASHR and then, when receiving a load fill packet, uses the accompanying identification information to determine an appropriate action. For instance, if a load instruction triggered the load fill request, the identifying information may identify an instruction and/or target register in the register file and the portion of the cache line that should be aligned and written to the identified destination(s). When the requested data becomes available, the wake-up logic marks any instructions waiting only for the fill data as ready for execution. A processor's receiving logic is typically pipelined in a way that allows instructions that are woken up to pick up and begin operating upon fill data in the same cycle that the data becomes available.

Note also that the L2 cache may need to store the request IDs associated with fill requests in a PASHR for some time. For instance, if the cache array look-up misses in the L2 cache, there may be some substantial delay while another fill request is sent from the L2 cache to a lower-level cache or memory. The miss in the L1 cache remains outstanding across this lower-level fill request, and the L2 cache needs to ensure that the needed data eventually reaches the waiting instruction in the processor core. Thus, information associated with the pending fill request needs to be preserved for the entire duration of the lower-level request (e.g., either in the PASHR, or if the information is displaced from the PASHR, using some other structure or technique).

In some embodiments, subsequent load fill packets (from the L2 cache) for the same cache line do not have to be sent contiguously. For instance, multiple duplicate load fill packets for one cache line may be interspersed and/or interleaved with load fill packets for other cache lines. For example, the L2 cache may only be able to send out one load fill packet every cycle, thus requiring some duplicate load fill packets to wait behind other load fill packets (e.g., until there is an "available slot" in the series of load fills).

In some embodiments, each L1 cache is associated with a private L2 cache. In such embodiments, the two caches may be connected by one set of wires that is not shared with other caches. In such an architecture, given spatial locality and the absence of other requests for other cache lines that displace a cache line from a PASHR and fill buffer, the L2 cache is likely to be able to update the preserved fill packet to avoid a number of unnecessary cache look-ups.

In some alternative embodiments, the L2 cache is shared by multiple L1 caches and/or a multi-threaded processor core, and multiple threads (potentially executing on multiple separate processor cores) may simultaneously send fill requests to an L2 cache. Such embodiments may involve additional hardware and/or techniques that handle multiple simultaneous requests. For instance, the L2 cache may include additional hardware that moves queued requests from the PASHR into a queue for L2 cache array look-ups. For example, in the worst case, the optimization techniques may be abandoned, and duplicate fill requests may be moved out of the PASHR and handled using separate cache array look-ups; while such scenarios may cause additional look-ups in the L2 cache, they do not affect the correctness of program execution.

In some embodiments, an L2 cache includes multiple PASHRs and fill buffers that facilitate filtering out duplicate (spatially related) fill requests. Incorporating multiple PASHRs and fill buffers into the L2 cache facilitates reducing performance impacts for scenarios where multiple fill requests may displace one another, including interleaved access patterns, multi-threaded processor cores, and/or multiple sources of fill requests (e.g., multiple L1 caches dependent on a single L2 cache). Increasing the number of PASHRs in an L2 cache does not substantially increase the hardware requirements or timing complexity of the L2 cache.

Figure 4A:
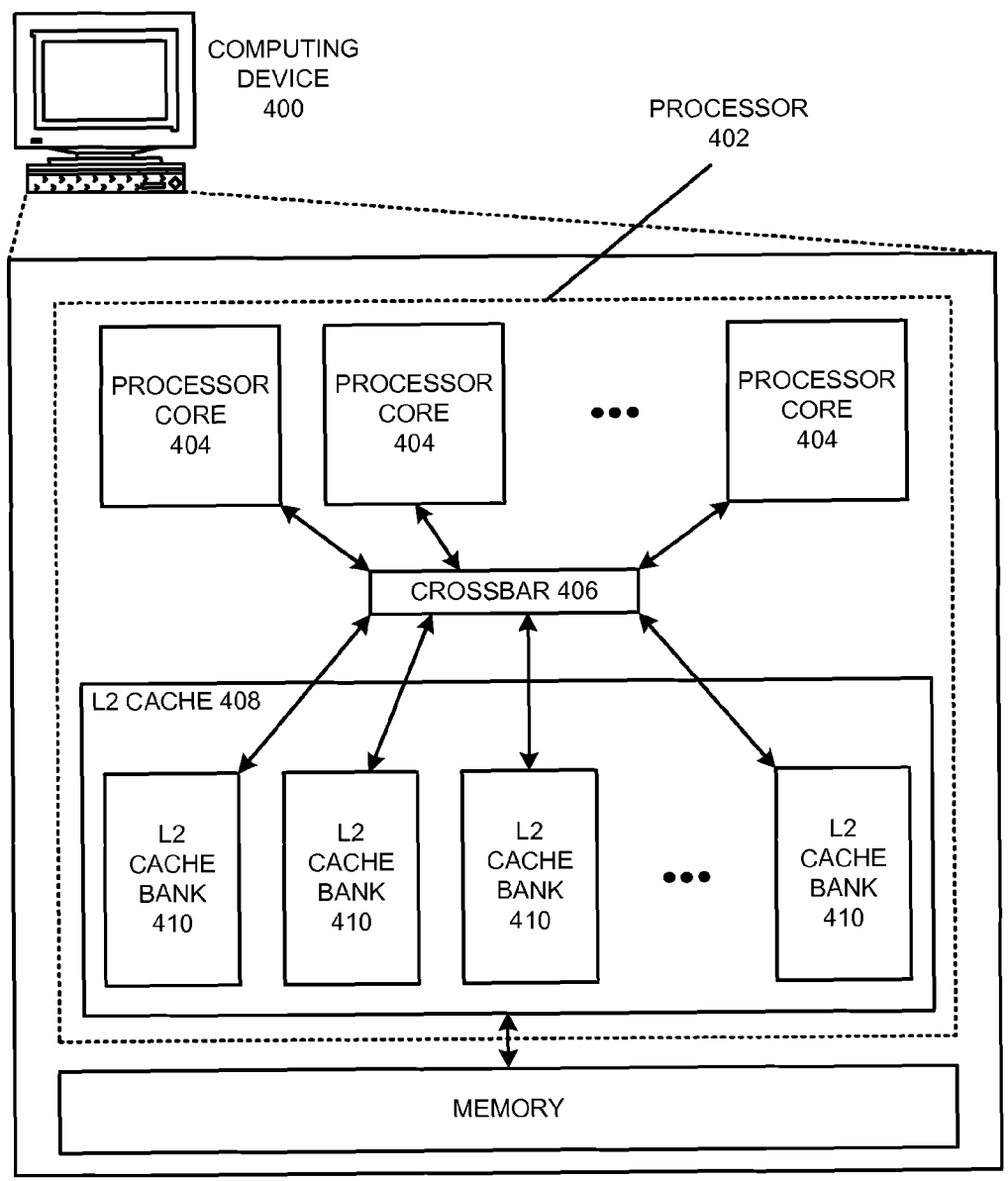
FIG. 4A illustrates an exemplary computing device that includes a processor with multiple processor cores and an L2 cache that may include multiple pending-access status-holding registers in accordance with an embodiment.

FIG. 4A illustrates an exemplary computing device 400 that includes a processor 402 with multiple processor cores 404 and an L2 cache 408 that may include multiple PASHRs. One or more processor cores 404 include L1 caches (not shown) that do not support secondary miss detection. These L1 caches access a multi-bank L2 cache 408 via a crossbar 406. Each L2 cache bank 410 may include one or more PASHRs. Thus, the fill requests of different L1 caches can be spread across different L2 cache banks 410 and different PASHRs, thereby improving overall L2 cache bandwidth and the efficiency with which cache filtering for duplicate fill requests is performed.

Figure 4B:
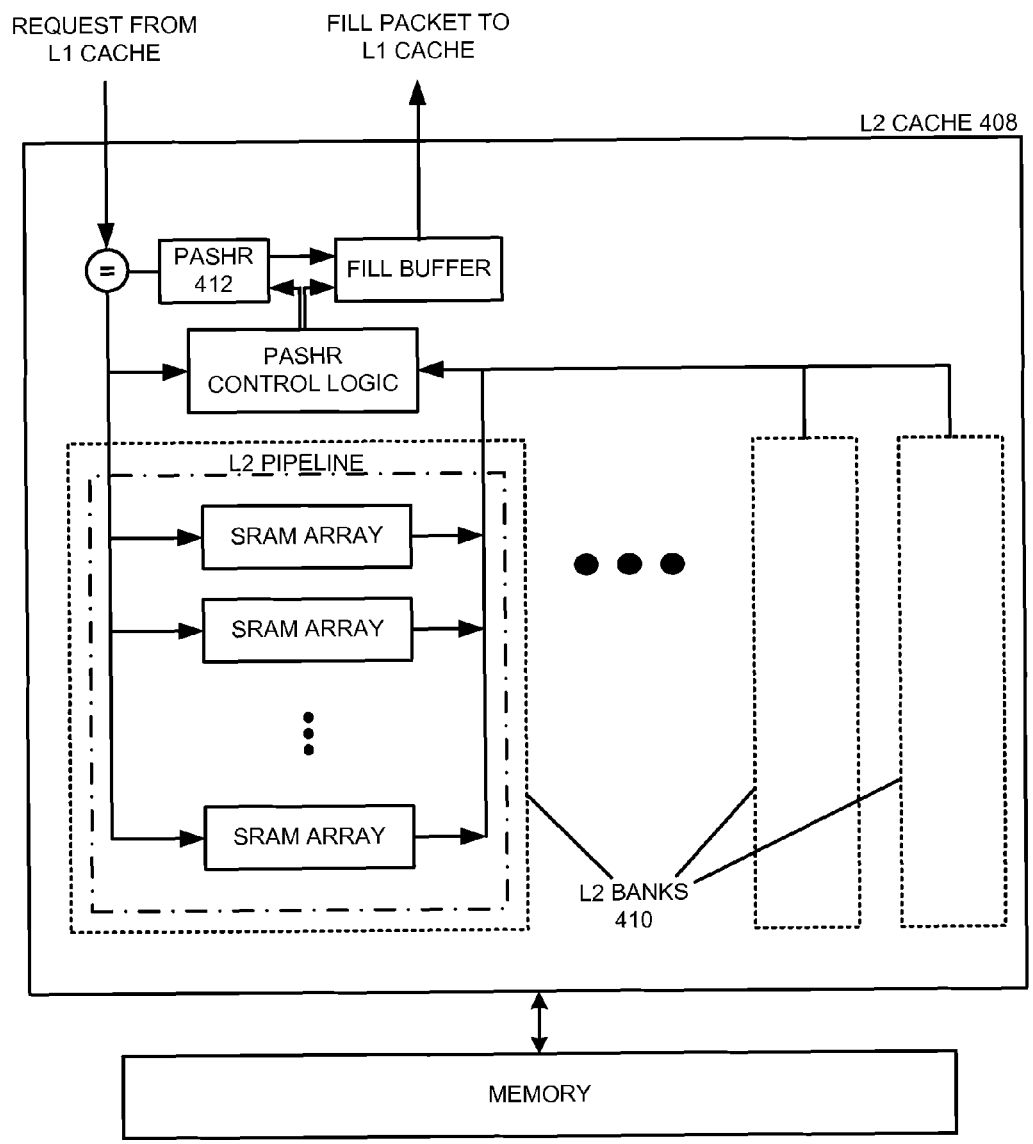
FIG. 4B illustrates an exemplary architecture in which a pending-access status-holding register is shared by multiple cache banks of an L2 cache in accordance with an embodiment.

Note that while FIG. 2B illustrates PASHR 200 as being incorporated into a cache bank 218, in other embodiments one or more PASHRs may be shared by multiple cache banks. For instance, FIG. 4B illustrates an exemplary L2 cache 408 in which a PASHR 412 is shared by multiple L2 cache banks 410. In this exemplary architecture, all requests coming into L2 cache 408 are first filtered by PASHR 412. Cache array accesses not filtered by PASHR 412 are then routed to an appropriate L2 cache bank 410 depending on how the cached data is partitioned across L2 cache banks 410 (e.g., based on the memory address being accessed). Note that sharing one or more PASHRs across multiple L2 cache banks may have different performance benefits and trade-offs compared to including one or more (unshared) PASHRs in each L2 cache bank.

In some embodiments that involve multiple peer caches and/or chips, another L2 or lower-level cache (or memory) may send an invalidation request to an L2 cache that invalidates a cache line that is currently being preserved by a PASHR and fill buffer. In such instances, the L2 cache needs to invalidate the PASHR and fill buffer to ensure that stale data is not sent to an L1 cache. A wide range of techniques may be used to perform such invalidations. For instance, the L2 cache may use a comparator to compare an address being invalidated with the physical address stored in the PASHR and, if the addresses match, unset the valid bit in the PASHR (and queue the pending requests from the PASHR for cache array look-ups). Alternatively, the L2 cache might not include an additional comparator, instead invalidating the information in the PASHR whenever any invalidation is received. Such an approach simplifies the invalidation logic at the cost of some additional duplicate cache array look-ups.

Note that the described cache filtering techniques are typically most useful for instructions that lead to an L1 data cache sending fill requests and an L2 data cache sending responding load fills (e.g., for load, store, and pre-fetch instructions). The disclosed techniques can also be applied to other cache levels (and a range of different cache types) that suffer from similar drawbacks (e.g., sensitive timing issues involving duplicate fill requests and load fill packets). For instance, substantially similar techniques can also be applied to processor instruction caches or to TLBs, which cache address translation data. For example, duplicate TLB miss requests may occur in a multi-level TLB architecture when a series of requests to an L1 TLB (that does not support secondary miss detection) miss, and generate multiple TLB fill requests for a single memory page (e.g., due to a set of data accesses that access the same memory page and require the same set of translation information, which has missed in the L1 TLB).

Note also that while the disclosed techniques are described in the context of out-of-order processors, they can be applied in any processor in which multiple memory access operations may be pending simultaneously. More specifically, the disclosed techniques can be used in any processor that can continue to execute past a cache miss (instead of stalling). For instance, the disclosed techniques can reduce the L2 cache load for a processor with hardware scout capabilities that speculatively executes across L1 cache misses. The disclosed techniques can also be applied for designs in which multiple requests can be sent for the same piece of data (e.g., multiple requests from the same L1 cache for a piece of data in a cache line, as well as multiple requests from different sources for the same piece of data in a cache line).

In summary, embodiments of the present invention involve techniques for reducing the negative L2 cache performance effects associated with eliminating secondary miss detection in an L1 cache. The disclosed techniques can use a PASHR in the L2 cache to detect and reduce overhead for multiple requests that have spatial locality. The L2 cache can construct additional load fill packets for the duplicate requests by combining cache line data preserved in a fill buffer with request-specific information tracked in the PASHR. By ensuring that multiple requests for the same cache line result in a single cache array look-up, the disclosed techniques substantially reduce the load and power consumption for the L2 cache.

Computing Environment

In some embodiments of the present invention, a cache that filters duplicate cache accesses may be incorporated into a wide range of computing devices in a computing environment.

Figure 5:
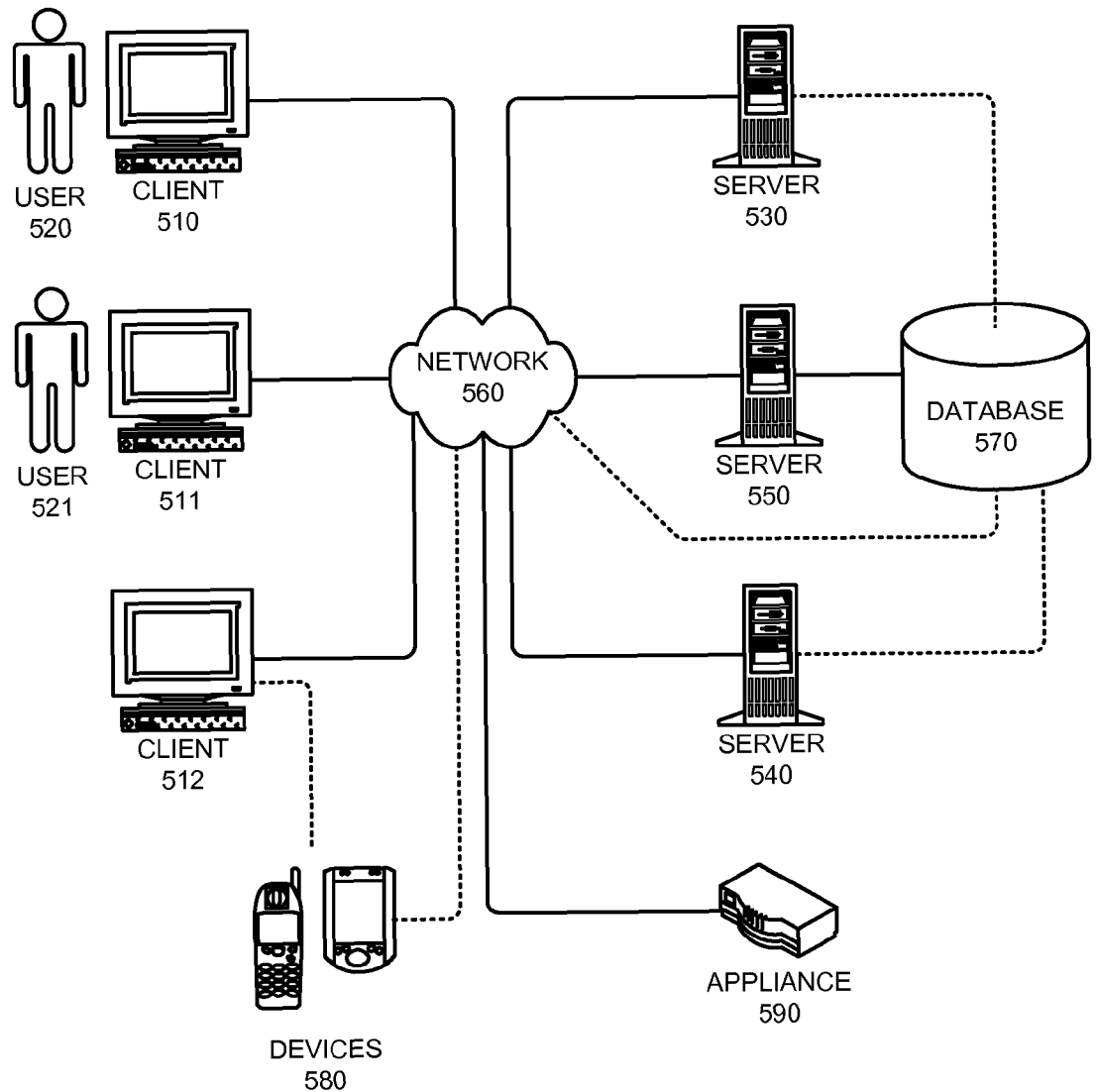
FIG. 5 illustrates a computing environment in accordance with an embodiment.

FIG. 5 illustrates a computing environment 500 in accordance with an embodiment of the present invention. Computing environment 500 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 5, computing environment 500 includes clients 510-512, users 520 and 521, servers 530-550, network 560, database 570, devices 580, and appliance 590.

Clients 510-512 can include any node on a network that includes computational capability and includes a mechanism for communicating across the network. Additionally, clients 510-512 may comprise a tier in an n-tier application architecture, wherein clients 510-512 perform as servers (servicing requests from lower tiers or users), and wherein clients 510-512 perform as clients (forwarding the requests to a higher tier).

Similarly, servers 530-550 can generally include any node on a network including a mechanism for servicing requests from a client for computational and/or data storage resources. Servers 530-550 can participate in an advanced computing cluster, or can act as stand-alone servers. In one embodiment of the present invention, server 540 is an online "hot spare" of server 550.

Users 520 and 521 can include: an individual; a group of individuals; an organization; a group of organizations; a computing system; a group of computing systems; or any other entity that can interact with computing environment 500.

Network 560 can include any type of wired or wireless communication channel capable of coupling together computing nodes. This includes, but is not limited to, a local area network, a wide area network, or a combination of networks. In one embodiment of the present invention, network 560 includes the Internet. In some embodiments of the present invention, network 560 includes phone and cellular phone networks.

Database 570 can include any type of system for storing data in non-volatile storage. This includes, but is not limited to, systems based upon magnetic, optical, or magneto-optical storage devices, as well as storage devices based on flash memory and/or battery-backed up memory. Note that database 570 can be coupled: to a server (such as server 550), to a client, or directly to a network. In some embodiments of the present invention, database 570 is used to store information related to virtual machines and/or guest programs. Alternatively, other entities in computing environment 500 may also store such data (e.g., servers 530-550).

Devices 580 can include any type of electronic device that can be coupled to a client, such as client 512. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention devices 580 can be coupled directly to network 560 and can function in the same manner as clients 510-512.

Appliance 590 can include any type of appliance that can be coupled to network 560. This includes, but is not limited to, routers, switches, load balancers, network accelerators, and specialty processors. Appliance 590 may act as a gateway, a proxy, or a translator between server 540 and network 560.

Note that different embodiments of the present invention may use different system configurations, and are not limited to the system configuration illustrated in computing environment 500. In general, any device that includes multiple levels of cache structures may incorporate elements of the present invention.

Previously described FIGS. 1-2B illustrate an L2 cache 110 that can filter duplicate requests from an L1 cache that does not support secondary miss detection. In some embodiments of the present invention, some or all aspects of core pipeline(s) 104, L1 cache 108, L2 cache 110, PASHR 200, PASHR control logic 226, and/or fill buffer 214 can be implemented as dedicated hardware modules in processor 102. For example, processor 102 can include one or more specialized circuits for performing the operations of the mechanisms. Alternatively, some or all of the operations of core pipeline(s) 104, L1 cache 108, L2 cache 110, PASHR 200, PASHR control logic 226, and/or fill buffer 214 may be performed using general-purpose circuits in processor 102 that are configured using processor instructions.

Although FIGS. 1-2B illustrate core pipeline(s) 104 and L1 cache 108 as being included in processor 102, and L2 cache 110, PASHR 200, PASHR control logic 226, and/or fill buffer 214 as not being included in processor 102, in alternative embodiments some or all of these mechanisms can be either external or internal to processor 102. For instance, these mechanisms may be incorporated into hardware modules external to processor 102. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for filtering duplicate requests for a cache line in an L2 cache, comprising:
   receiving at the L2 cache a first request and a second request for the cache line, wherein the first request and the second request are received from one or more L1 caches;
   storing identifying information for the requests in the L2 cache;
   loading the cache line into a fill buffer of the L2 cache while creating a first load fill packet for the first request;
   sending the first load fill packet from the L2 cache to at least one of the one or more L1 caches; and
   after sending the first load fill packet, using the loaded fill buffer and the stored identifying information to send a subsequent load fill packet for the second request from the L2 cache to at least one of the one or more L1 caches.

2. The method of claim 1, wherein sending the subsequent load fill packet further comprises:
   preserving the cache line data from the first load fill packet in the fill buffer; and
   updating the fill buffer to include a request identifier associated with the second request.

3. The method of claim 2,
   wherein the L2 cache sends load fill packets to an L1 cache which does not support secondary miss detection; and
   wherein the L2 cache receives multiple duplicate requests for the same cache line from the L1 cache.

4. The method of claim 3, wherein not supporting secondary miss detection in the L1 cache facilitates simplifying the hardware and timing requirements for the L1 cache.

5. The method of claim 3,
   wherein loading the cache line into the fill buffer involves performing a look-up in a cache array of the L2 cache; and
   wherein re-using the data in the loaded fill buffer for the second request facilitates sending additional load fill packets for the cache line while avoiding duplicate look-ups in the cache array.

6. The method of claim 2, wherein storing identifying information associated with the requests further comprises storing one or more of the following:
   an address associated with the cache line;
   a first request identifier for the first request; and
   a second request identifier for the second request.

7. The method of claim 6,
   wherein the information associated with one or more requests for the cache line is stored in a pending-access status-holding register; and
   wherein storing the information in the pending-access status-holding register facilitates adjusting a request identifier in an outgoing load fill for a specific request.

8. The method of claim 7, wherein the method further comprises using two or more pending-access status-holding registers to track multiple requests associated with two or more different cache lines.

9. The method of claim 7, wherein the method further comprises invalidating the pending-access status-holding register and the information in the fill buffer upon receiving a cache line invalidation request for the cache line.

10. The method of claim 3,
wherein the L1 cache is an L1 TLB;
wherein the L2 cache is an L2 TLB; and
wherein the L1 and L2 TLBs cache address translation data.

11. An L2 cache that filters duplicate requests from one or more L1 caches for a cache line, comprising:
a fill buffer; and
a pending-access status-holding register;
wherein the pending-access status-holding register is configured to:
receive a first request and a second request one or more L1 caches; and
store identifying information for the requests; and
wherein the L2 cache is configured to:
load the cache line into the fill buffer while creating a first load fill packet for the first request;
preserve the cache line in the fill buffer after sending the first load fill packet to at least one of the one or more L1 caches; and
after sending the first load fill packet, use the loaded fill buffer and the stored information in the pending-access status-holding register to send a subsequent load fill packet for the second request from the L2 cache to at least one of the one or more L1 caches.

12. The L2 cache of claim 11, wherein the L2 cache is further configured to update the fill buffer to include a request identifier associated with the second request.

13. The L2 cache of claim 12,
wherein the L2 cache sends load fill packets to an L1 cache which does not support secondary miss detection; and
wherein the L2 cache receives multiple duplicate requests for the same cache line from the L1 cache.

14. The L2 cache of claim 13, wherein not supporting secondary miss detection in the L1 cache facilitates simplifying the hardware and timing requirements for the L1 cache.

15. The L2 cache of claim 13,
wherein the L2 cache is further configured to load the cache line into the fill buffer by performing a look-up in a cache array of the L2 cache; and
wherein re-using the data in the loaded fill buffer for the second request facilitates sending additional load fill packets for the cache line while avoiding duplicate look-ups in the cache array.

16. The L2 cache of claim 12, wherein the pending-access status-holding register is configured to store one or more of the following:
an address associated with the cache line;
a first request identifier for the first request; and
a second request identifier for the second request.

17. The L2 cache of claim 16, wherein storing the information in the pending-access status-holding register facilitates updating the fill buffer to include the request identifier for the second request.

18. The L2 cache of claim 17, wherein the L2 cache further comprises two or more pending-access status-holding registers that track multiple requests associated with two or more different cache lines.

19. The L2 cache of claim 17, wherein the L2 cache further comprises an invalidation mechanism configured to invalidate the pending-access status-holding register and the information in the fill buffer upon receiving a cache line invalidation request for the cache line.

20. A computer system that facilitates cache access filtering, comprising:
a processor;
one or more L1 caches that do not support secondary miss detection; and
an L2 cache that includes a fill buffer and a pending-access status-holding register;
wherein the pending-access status-holding register is configured to:
receive a first request and a second request from one or more L1 caches; and
store identifying information for the requests; and
wherein the L2 cache is configured to:
load the cache line into the fill buffer while creating a first load fill packet for the first request;
preserve the cache line in the fill buffer after sending the first load fill packet to at least one of the one or more L1 caches; and
after sending the first load fill packet, use the loaded fill buffer and the stored information in the pending-access status-holding register to send a subsequent load fill packet for the second request from the L2 cache to at least one of the one or more L1 caches.

* * * * *